United States Patent [19]

Dandl

[11] 4,244,597
[45] Jan. 13, 1981

[54] SIDE MOUNTING ASSEMBLY FOR TRACTOR IMPLEMENT

[76] Inventor: John E. Dandl, P.O. Box 687, Chico, Calif. 95926

[21] Appl. No.: 42,872

[22] Filed: May 29, 1979

[51] Int. Cl.³ .................. B60D 1/14; A01B 51/00; A01D 35/262
[52] U.S. Cl. .................................. 280/473; 56/10.7; 56/16.2
[58] Field of Search ............. 180/53 D; 280/472, 473; 56/14.7, 14.9, 16.2, 15.9, 15.6, 10.7, 10.9; 172/272–275, 800, 305, 297, 201

[56] References Cited

U.S. PATENT DOCUMENTS

| | | | |
|---|---|---|---|
| 2,777,272 | 1/1957 | Smith et al. | 56/10.9 |
| 3,007,266 | 11/1961 | Brand | 172/273 |
| 3,624,698 | 11/1971 | Storm | 56/10.7 |
| 3,800,882 | 4/1974 | Werts et al. | 172/273 |

*Primary Examiner*—John J. Love
*Assistant Examiner*—Donn McGiehan
*Attorney, Agent, or Firm*—Robert Charles Hill

[57] ABSTRACT

A mounting assembly for supporting a side-mounted implement such as a mower attachment or the like upon a tractor includes a central mounting beam extending longitudinally beneath the tractor with front and rear saddles connecting the beam with the front housing and rear tractor axle, a support arm assembly interconnecting the implement with a central portion of the beam so that the weight of the implement or reaction forces from the support arm assembly and implement are transferred directly to the front housing and rear axle of the tractor.

8 Claims, 2 Drawing Figures

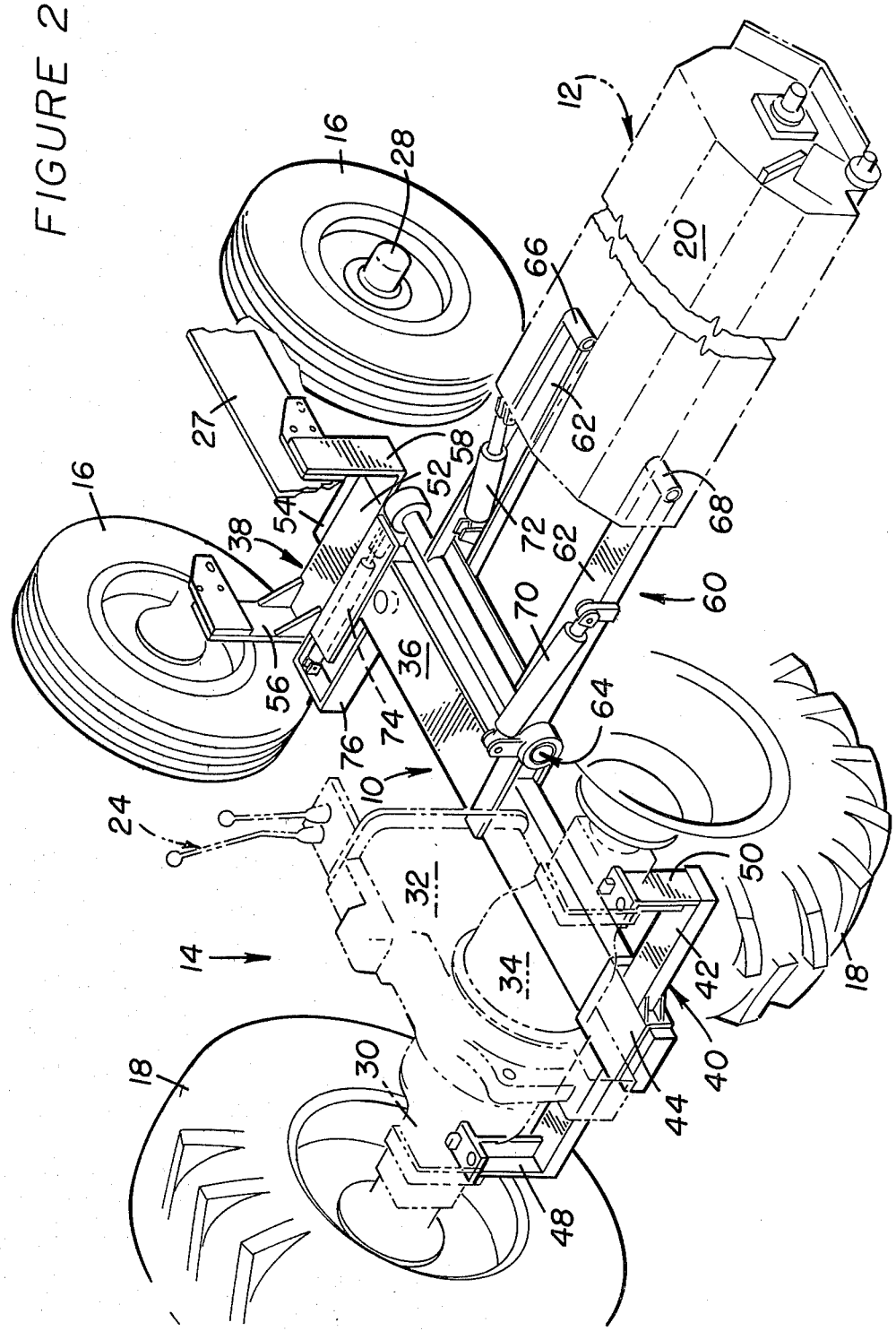

SIDE MOUNTING ASSEMBLY FOR TRACTOR IMPLEMENT

BACKGROUND OF THE INVENTION

The present invention relates to a mounting assembly for supporting an implement upon a tractor and more specifically to such a mounting assembly for supporting a side-mounted implement such as a mower attachment or the like.

It has become common practice to arrange implements such as mowers and the like for side-mounting upon tractors, the implement extending from either side of the tractor between its front and rear wheels. Such an arrangement has been found to be particularly desirable because of the compact configuration for the tractor and implement while providing the tractor operator with an excellent view of the implement during operation. At the same time, the implement tends to be more maneuverable because of its side-mounted arrangement upon the tractor.

Most tractors of the type contemplated by the present invention include heavy frame members extending between the front and rear tractor wheels to support the tractor engine, operator station, etc. In the past, it has been common practice to attach the side-mounted implements directly to these frame members for the tractor. For example, a side-mounted mower including means for attaching the mower implement directly to the tractor frame is illustrated in U.S. Pat. No. 3,023,561 issued Mar. 6, 1962. Other side-mounted implements or mowers including mounting means for connection directly to the tractor frame are also illustrated in U.S. Pat. No. 3,040,502 issued June 26, 1962 and U.S. Pat. No. 3,053,033 issued Sept. 11, 1962. Such mounting arrangements have been found to provide a simple and effective means for side mounting of implements such as mowers. However, when the implement is mounted upon the tractor frame in this manner, the weight of the implement or reaction forces developed between the implement and its mounting is transferred to the tractor axles and wheels through the frame members. Accordingly, the tractor frame members must be strengthened to not only perform their normal structural functions within the tractor but also to carry or transfer reaction forces from the implement to the tractor axles. In the event that the tractor frame is not sufficiently strengthened or reinforced for this purpose, use of such a side-mounted implement upon the tractor may tend to interfere with normal operation of the tractor, particularly over long periods of operation.

Accordingly, there has been found to remain a need for a mounting assembly to efficiently and simply support a side mounted implement such as a mower attachment upon such a tractor with at least a substantial portion of the weight or reaction forces developed by the implement being transferred directly to at least one tractor axle.

SUMMARY OF THE INVENTION

It is therefore an object of the present invention to provide a mounting assembly for supporting a side-mounted implement such as a mower attachment or the like upon a tractor while overcoming one or more problems of the type set forth above. More specifically, it is an object of the present invention to provide such a mounting assembly including a central mounting beam extending longitudinally beneath the tractor with at least one end of the beam being interconnected at laterally spaced apart portions of an axle for the tractor. Such a combination permits at least a substantial portion of the weight or reaction forces developed by the implement to be transferred directly to at least the one tractor axle.

It is a further object of the invention to provide such a mounting assembly having a central mounting beam extending longitudinally beneath the tractor with laterally extending saddles at either end of the beam being connected directly to the respective front housing and rear axle for the tractor so that effectively all of the weight and reaction forces developed by the implement are transferred directly to the rear tractor axle and front housing.

It is yet another related object of the invention to provide such a mounting assembly wherein the central mounting beam is connected to at least one tractor axle by means permitting use of the mounting assembly as part of a trailer unit for the tractor.

Still another object of the invention is to provide such a mounting assembly having a laterally extending saddle for connection with a tractor axle, the saddle being slidable or movable upon the longitudinal mounting beam in order to adapt the mounting assembly for use with different tractors.

Additional objects and advantages of the present invention are made apparent in the following description having reference to the accompanying drawings.

BRIEF DESCRIPTION OF THE DRAWING

FIG. 2 is a fragmentary view of the tractor with most of its chassis removed in order to better illustrate construction of the present mounting assembly.

DESCRIPTION OF THE PREFERRED EMBODIMENT

Figure 1:
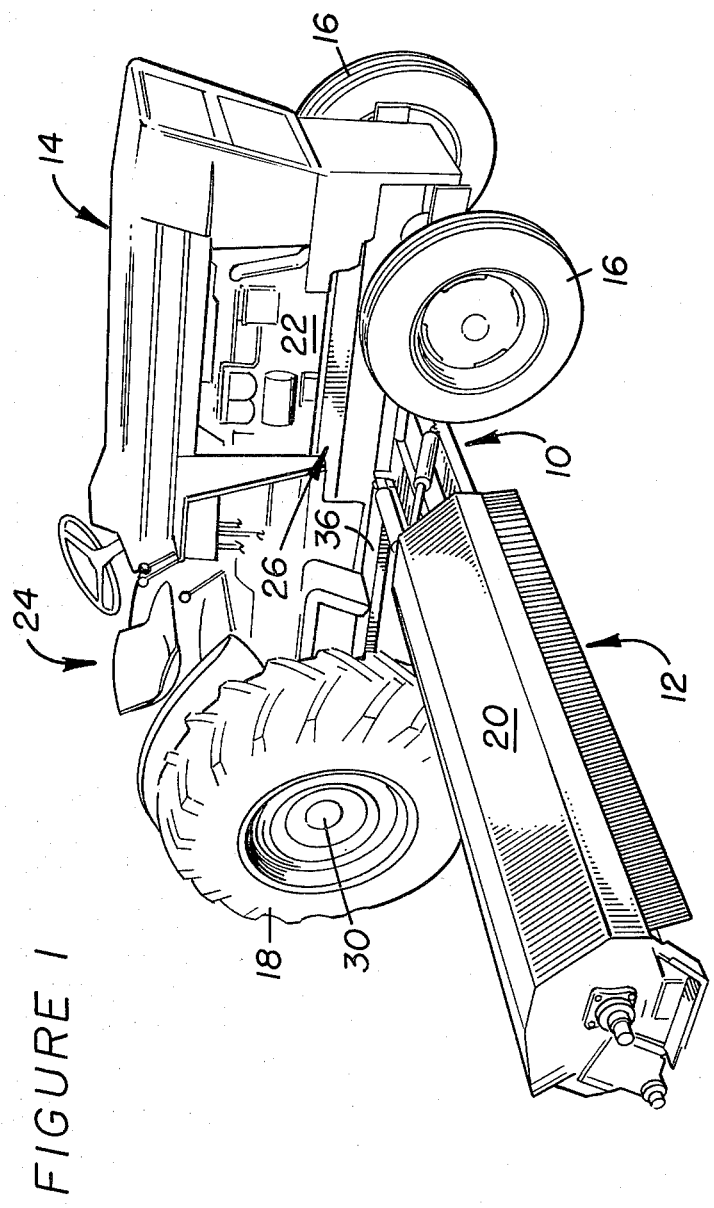
FIG. 1 is a perspective view of a tractor having a side-mounted mower attachment thereon by a mounting assembly constructed in accordance with the present invention.

A mounting assembly of the type contemplated by the present invention is indicated at 10 in each of FIGS. 1 and 2 for supporting a side-mounted implement or mower attachement 12 upon a tractor 14. The internal construction and mode of operation for the mower attachment is not important to the present invention. It is sufficient for purposes of the present invention to understand that the mower attachment extends laterally in cantilevered fashion from one side of the tractor between its front and rear wheels 16 and 18. Preferably, the mower attachment 12 is of a type including a plurality of rotary cutter means (not shown) which are arranged within a housing or enclosure 20. However, the mower attachment could be of other design, for example, a reciprocating boom-type mower or the like. The mounting assembly 10 of the present invention could also be employed to attach other side-mounted implements upon the tractor.

The tractor 14 is of the type having an engine 22 and operator station 24 mounted upon a frame assembly 26 and extending between the front and rear axles 28 and 30 for the tractor. A portion of the frame assembly 26 is illustrated in FIG. 2 in conjunction with the rear tractor axle 30, including a differential housing 32 and a portion of the operator station 24. As noted above, the front wheels 16 are mounted on opposite ends of the front axle 28 while the rear wheels 18 are mounted on opposite ends of the rear axle 30. It is further noted that the rear axle 30 for the tractor forms a housing 34 for containing the tractor differential (not shown) and drive shafts (also not shown) for interconnecting the rear wheels 18 with the differential in a conventional manner.

The mounting assembly 10 of the present invention includes, as a particularly important element, a mounting beam centrally arranged in longitudinally extending fashion beneath the frame of the tractor. The mounting beam is sufficiently long to effectively extend between the frame and rear axles of the tractor. The opposite ends of the mounting beam 36 are interconnected respectively with the front housing 27 (FIG. 2) and rear tractor axle 30 by means of saddle assemblies generally indicated at 38 and 40.

The rear saddle assembly 40 includes a lateral crosspiece 42 with a symmetrical bracket 44 engaging the rearward end of the mounting beam 36. The bracket 44 is initially slidable upon the beam and may be secured thereupon, for example, by welding to adapt the mounting assembly for use with a specific tractor. Upstanding brackets 48 and 50 are formed at opposite ends of the rear saddle crosspiece 42 for attachment to opposite ends of the rear tractor axle 30 by means of bolts or the like (not shown). The wide spacing between the upstanding brackets 48 and 50 serves to better transfer weight or reaction forces from the mower attachment 12 to the rear tractor axle 30.

To further facilitate the transfer of weight or forces in this manner, the central mounting beam 36 is preferably of fabricated box construction as may be seen in FIG. 2, the mounting beam fitting within the symmetrical bracket 44 of the rear saddle crosspiece 42 so that torgue-type forces applied to the mounting beam are transferred to the outer ends of the rear axle. The slidable arrangement for the rear saddle assembly 40 upon the mounting beam 36 permits the spacing between the front and rear saddles 38 and 40 to be adjusted at least initially in order to adapt the mounting assembly for use with different tractors having different spacings between their axles.

The front saddle assembly 38 similarly includes a lateral crosspiece 52 secured to a forwardly extending projection 54 of the mounting beam 36. Vertical or upstanding brackets 56 and 58 are secured to opposite ends of the crosspiece 52 for interconnection to the front housing 27 of the tractor by welding or bolts.

Accordingly, with the front and rear saddle assemblies 38 and 40 being connected directly to the front housing and rear axle 27 and 30, effectively all weight or reaction forces from the mower attachment 12 are transferred directly to the front housing and rear axle without adding additional stress to its central frame assembly.

The mower attachment 12 is connected to the mounting beam 36 by means of a support arm assembly generally indicated at 60. The support arm assembly 60 includes a U-shaped element 62 which is pivotally connected at 64 to the mounting beam 36 while forming a pair of aligned pivot brackets 66 and 68 for direct connection to the mower attachment 12.

Operating power may be supplied to the mower in generally conventional fashion. For example, the mower attachment may be mechanically connected to a power takeoff (not shown) for the tractor or a hydraulic motor (also not shown) for operating the mower attachment may be directly carried upon the mower attachment or upon the mounting beam 36.

Controls for positioning the mower attachment 12 are best seen in FIG. 2. For example, a first extensible hydraulic cylinder 70 is interconnected between the U-shaped element 62 of the support arm assembly and a rigid portion of the mounting beam in order to raise and lower the mower attachment. Similarly, another extensible hydraulic cylinder 72 is interconnected between the U-shaped element 62 and a structural portion of the mower housing 20 in order to raise and lower the mower attachment itself. Yet another extensible hydraulic cylinder 74 is interconnected between a structural extension 76 of the mounting beam 36 and the pivot assembly 64 of the support arm assembly in order to angularly adjust the mower attachment relative to the longitudinal axis of the tractor. Additional control elements may also be provided as necessary or desired to facilitate operation of the mower attachment or other implement.

Numerous modifications and variations are possible within the scope of the present invention and are believed to be apparent from the preceding description.

I claim:

1. A mounting assembly for supporting a side mounted mower attachment or the like upon a tractor having front housing and rear axle, comprising
    (a) a central mounting beam extending longitudinally beneath the tractor,
    (b) front and rear saddles interconnected respectively with forward and rearward ends of the beam and each extending outwardly to form brackets for connection to the front housing and rear axle respectively, and
    (c) a support arm assembly adapted for interconnection with the mower attachment and a central portion of the beam for supporting the mower attachment upon the tractor, the longitudinal beam and the front and rear saddles being arranged for interaction with each other to transfer torque reaction forces from the support arm assembly and mower attachment directly to the front housing and rear axle of the tractor.

2. The mounting assembly of claim 1 wherein the longitudinal beam is of fabricated box construction to facilitate transfer of torque reaction forces to the front and rear saddles.

3. The mounting assembly of claim 1 wherein one of the front and rear saddles adjustably engages the horizontal beam to adapt the mounting assembly for use with different tractors.

4. The mounting assembly of claim 3 wherein the one saddle is slidable upon the longitudinal beam.

5. The mounting assembly of claim 1 wherein the support arm assembly comprises a pivot axis between the longitudinal beam and the mower attachment and further comprising control means for controlling and adjusting operation of the mower attachment.

6. A mounting assembly for supporting a side-mounted torque producing implement upon a tractor having a rear axle, comprising
    (a) central mounting beam extending longitudinally beneath the tractor,
    (b) means supporting the forward end of the beam from a front portion of the tractor,
    (c) a rear saddle interconnected with the rearward end of the mounting beam and extending laterally outwardly, brackets being arranged upon the laterally outward ends of the saddle for connection to the rear tractor axle, and (d) a support arm assembly adapted for interconnection with the side-mounted implement and a central portion of the beam for supporting the implement, the longitudinal beam and rear saddle interacting to transfer a substantial portion of the torque reaction forces from the support arm assembly and implement to the rear tractor axle.

7. The mounting assembly of claim 6 wherein the longitudinal beam is of fabricated box construction to facilitate transfer of torque reaction forces to the rear saddle.

8. The mounting assembly of claim 6 wherein one of the rear saddle and front mounting means is movable upon the longitudinal beam for adapting the mounting assembly for use with different tractors.

* * * * *